United States Patent [19]
Hinton et al.

[11] Patent Number: 5,335,333
[45] Date of Patent: Aug. 2, 1994

[54] GUESS MECHANISM FOR FASTER ADDRESS CALCULATION IN A PIPELINED MICROPROCESSOR

[75] Inventors: Glenn J. Hinton, Portland; Gyanendra Tiwary, Hillsboro, both of Oreg.

[73] Assignee: Intel Corporation, Santa Clara, Calif.

[21] Appl. No.: 784,566

[22] Filed: Oct. 29, 1991

[51] Int. Cl.$^5$ ............................................. G06F 12/00
[52] U.S. Cl. .............................. 395/400; 364/255.1; 364/255.7; 364/256.3; 364/255.2
[58] Field of Search ............................. 395/400, 425

[56] References Cited

U.S. PATENT DOCUMENTS

| | | | |
|---|---|---|---|
| 4,622,631 | 11/1986 | Frank et al. | 395/425 |
| 4,811,206 | 3/1989 | Johnson | 395/400 |
| 4,847,748 | 7/1989 | Yamahata et al. | 395/400 |

Primary Examiner—Rebecca L. Rudolph
Attorney, Agent, or Firm—Owen L. Lamb

[57] ABSTRACT

A processor in which instructions and data at logical addresses are mapped onto real memory locations at physical addresses that are translated from the logical addresses by a translation lookaside buffer (TLB) that takes one clock phase to perform this function. The TLB only needs the upper 20 bits of a logical address, which bits correspond to the logical page number, to do the translation to a physical address. The lower 12 bits are not needed until the TLB translation is done. The add of the "base-plus-displacement/offset" usually does not cross a page boundary, that is, the upper 20 bits are the same after the add. A mechanism takes this into account and guesses that the upper 20 bits will not change, and sends them to the TLB. In parallel with the TLB translation, the effective address add of the "base-plus-displacement" is computed. After the add, if the upper 20 bits did not change, then the 20 physical address bits from the TLB plus the lower 12 bits from the address computation are concatenated to produce the complete correct 32-bit physical address. If the upper 20 bits did change due to the actual add then the logical page number (the upper 20 bits) that were given the TLB were wrong. This is detected and a signal is generated that tells the memory side to redo the last memory access, and to use the new 32-bit logical address that was just computed by the effective address-generation hardware.

7 Claims, 4 Drawing Sheets

GUESS MECHANISM FOR FASTER ADDRESS CALCULATION IN A PIPELINED MICROPROCESSOR

CROSS REFERENCES TO RELATED APPLICATIONS

This application is related to the following copending patent application "A Pipeline Microprocessor in Which Multiple Functions are Performed During Each Pipeline Stage", Ser. No. 07/630,499, filed Dec. 12, 1990, now SIR H 001291 dated Feb. 1, 1994 assigned to Intel Corporation.

BACKGROUND OF THE INVENTION

1. Field of the Invention

The invention relates to data processing systems and more particularly to a pipelined microprocessor and a method and apparatus therein for address calculation for different addressing modes.

2. Description of the Related Art

Users of modern computers are demanding greater speed in the form of increased throughput (number of completed tasks per unit of time) and increased speed (reduced time it takes to complete a task). The Reduced Instruction Set Computer (RISC) architecture is one approach system designers have taken to achieve this. Generally a RISC machine can issue and execute an instruction per clock cycle. In a RISC machine only a very few instructions can access memory, so most instructions use on-chip registers.

In a process or with a 4Kbyte page size, the upper 20 bits of an address are needed by the virtual-to-physical address translator. Experience has shown that the most common offset calculations involve the lower 12 bits of the address and require a page crossing in less than 5 percent of all cases.

It is therefore an object of the invention to provide an addressing mode speedup method and means which improves the performance of some very frequently used addressing modes.

The invention has the advantages that it improves the "base-plus-displacement/offset" and the "scaled-index-plus-displacement" addressing modes by one clock most of the time.

The invention has the further advantage that address calculations are performed in one clock cycle for frequently used addressing modes.

SUMMARY OF THE INVENTION

Briefly, the above object is accomplished in accordance with the invention by providing in a microprocessor including a TLB which translates to a physical address a logical address comprised of a lower bits and upper bits,
means for sending said upper bits to said TLB for translation into upper bits of a physical address;
means for computing, in parallel with the TLB translation, an effective address add of the "base-plus-displacement";
means for concatenating said upper physical address bits from said TLB and said lower bits from said address computation to produce a complete correct physical address;
means for generating a redomemq21 signal upon the condition that said upper bits changed; and,
means in said TLB responsive to said redomemq21 signal for redoing the last memory access, using the new logical address that was just computed by said effective address-generation hardware.

BRIEF DESCRIPTION OF THE DRAWINGS

The foregoing and other objects, features, and advantages of the invention will be apparent from the following more particular description of a preferred embodiment of the invention as illustrated in the accompanying drawings.

DESCRIPTION OF THE PREFERRED EMBODIMENT

U.S. Pat. No. 4,891,753 "Register Scoreboarding on a Microprocessor Chip" granted on Jan. 2, 1990 and assigned to Intel Corporation, describes a microprocessor which has four basic instruction formats that must be word aligned and are 32-bits in length. The REG format instructions are the register-to-register integer or ordinal (unsigned) instructions. The MEM format instructions are the loads, stores, or address computation (LDA) instructions. The MEM format allows an optional 32-bit displacement. The CTRL format instructions are the branch instructions. The COBR format is an optimization that combines a compare and a branch in one instruction. The microprocessor in which the present invention is embodied has a 32-bit linear address space and has 32 general purpose registers. Sixteen of these registers are global and 16 are local. These 16 local registers are saved automatically on a call and restored on each return. The global registers, like the registers in more conventional microprocessors, retain their values across procedure boundaries.

Figure 1:
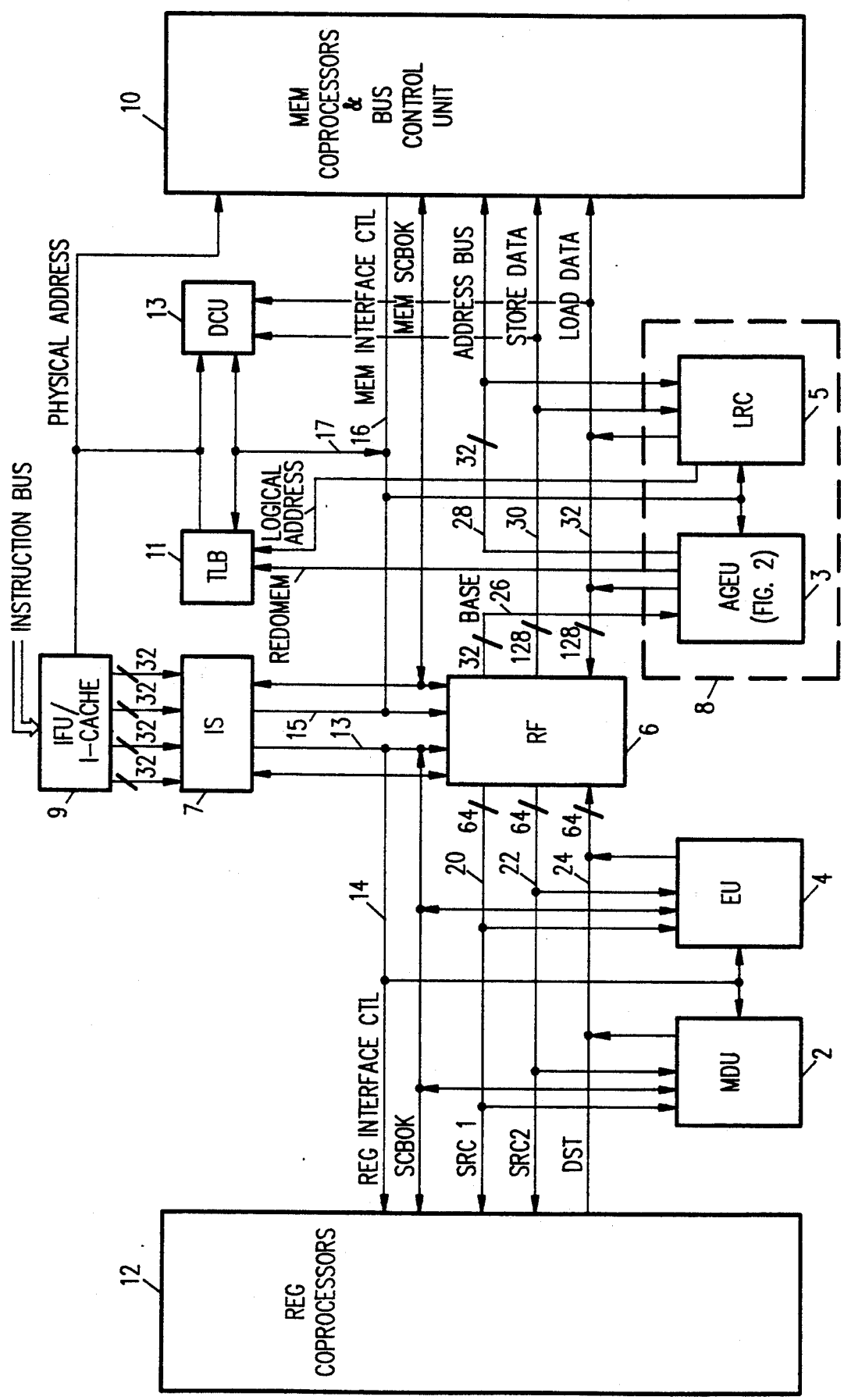
FIG. 1 is a functional block diagram of a microprocessor in which the present invention is embodied.

As shown in FIG. 1 the microprocessor in which the present invention is embodied has a number of units that the are briefly described below. For more detailed information about each of these units refer to the above-identified application SN 07/630,499.

Instruction Cache and ROM (I-Cache)

The instruction cache and ROM (9) provide the Instruction Sequencer (7) with instructions every cycle. Three or four words per clock are supplied regardless of the alignment of the instruction address. The I-Cache also contains the external fetch handling logic that is used when an instruction fetch misses the I-Cache.

Instruction Sequencer (IS)

The instruction sequencer (7) decodes the incoming four instruction words from the I-Cache. It can decode and issue up to three instructions per clock but it can never issue more than four instructions in two clocks. The IS decodes the instruction stream and drives the decoded instructions onto the machine bus.

The RF (6) has 16 local and 16 global registers. The RF has 4 independent read ports and 2 independent write ports to support the machine parallelism. It also checks and maintains a register scoreboarding logic.

Execution Unit (EU)

The EU (4) performs all the simple integer and ordinal (unsigned) operations of the microprocessor in which the present invention is embodied. All operations take a single cycle.

Multiply-Divide Unit (MDU)

The MDU (2) performs the integer/ordinal multiply, divide, remainder, and modulo operations. It performs an 8-bit-per clock multiply and a 1 bit-per-clock divide.

Address Generation and Execution Unit (AEGU)

The AGEU (3) is used to do the effective address calculations in parallel with the integer execution unit. It performs the load-effective-address instructions (LDA) and also does the address computations for loads and stores. It has a 32-bit carry-look-ahead adder and a shifter in front of the adder to do the prescaling for the scaled index addressing modes. The AGEU logic is shown in more detail in FIG. 2 described below.

Local Register Cache (LRC)

The LRC (5) maintains a stack of multiple 16-word local register sets. On each call the 16 local registers are transferred from the RF to the LRC. This allocates the 16 local registers in the RF for the called procedure. On a return the 16 words are transferred back into the RF to the calling procedure. With this LRC the call and return instructions take two clocks.

On-Chip Coprocessors

The microprocessor in which the present invention is embodied has two very high performance interfaces—the REG interface (14) and MEM interface (16). These interfaces allow application-optimized modules to be added to tailor the system to a particular application area. The REG interface is where all the REG format instructions are executed. The EU (4) and MDU (2) described above are coprocessors (on-chip functional units) sitting on the REG interface.

One instruction per clock can be issued on the REG part of the machine. The operations can be single or multi-cycle as long as they are independently sequenced by the respective REG coprocessor (12). The coprocessors on the REG interface arbitrate among themselves if necessary to return their results.

The MEM interface (16) is where all MEM format instructions are executed. It also connects the system to the memory subsystem. The on-chip memory subsystem can be a bus controller that connects to off-chip memory. The AGEU (3) and LRC (5) mentioned above are coprocessors on the MEM interface. One instruction per clock can be issued on this interface. The operations can be single or multi-cycle just as described above for the REG coprocessors. The coprocessors on this interface arbitrate among themselves if needed to return their results.

The Basic Pipeline

In this specification, signals follow a naming convention to help clarify the description of the pipeline. It is based on the pipeline stage and the clock phase. A control signal latched in the clock phase 2 (Ph2) portion of pipeline stage 1 has a suffix of q12, e.g. LdRegq12. The "q" is a delimiter indicating that the signal is latched or trapped and so will be constant for the phase indicated and also the following phase. The "12" indicates pipe 1 ph2. Other examples are S1Adrq11, BclGntq41, etc. If a signal is only valid during one phase (for example a precharge/discharge signal) it is suffixed with "u21", e.g. LdRamu12. The "u" delimiter indicates this signal is only valid for one phase.

Figures 3, 4B:
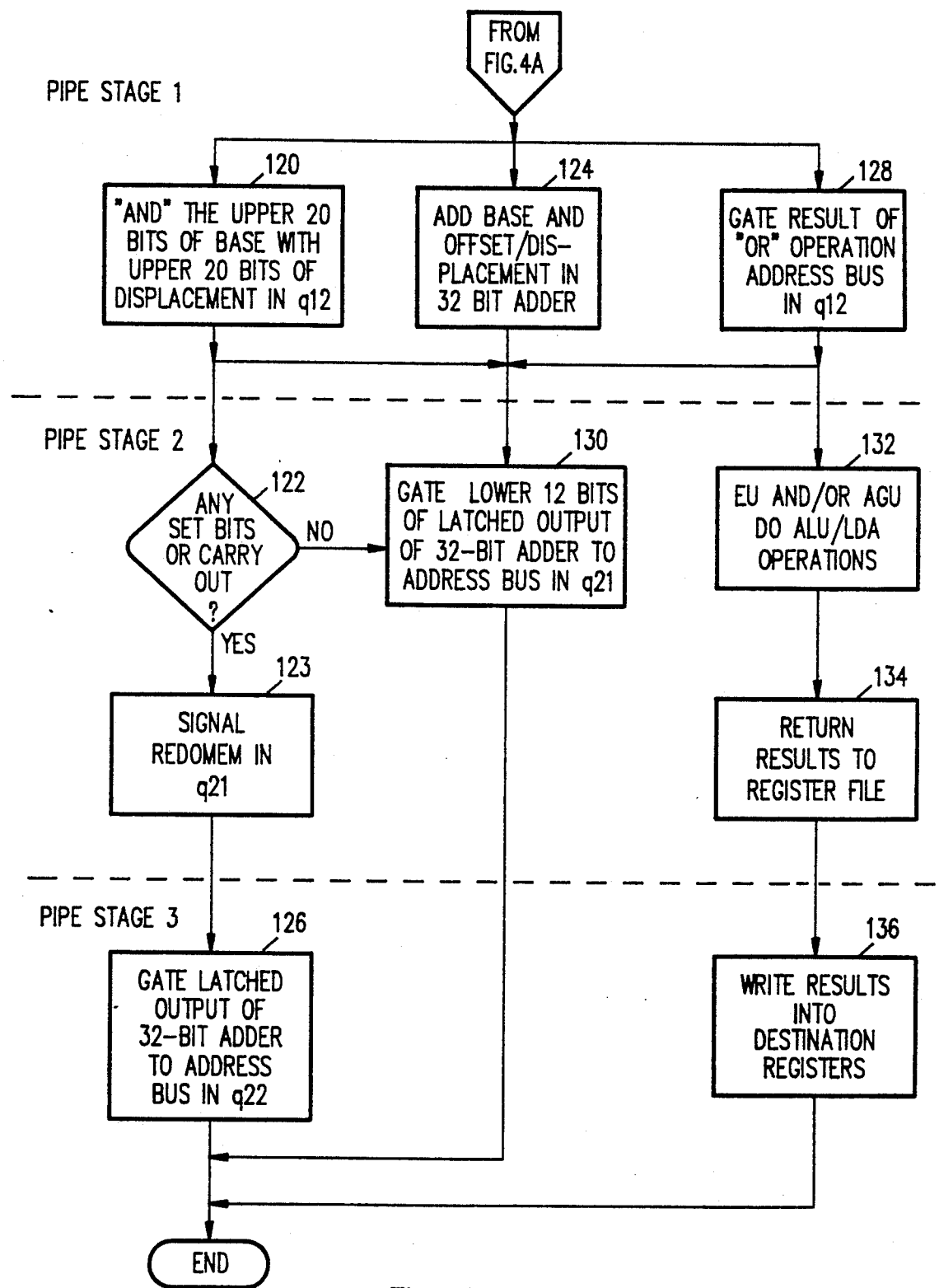
FIG. 3 is a timing diagram of a four stage pipeline for the basic operations; and, FIGS. 4a and 4b are a flow chart of the method of operation of the logic within the Address Generation and Execution Unit of FIG. 1.

As FIG. 3 shows, the microprocessor in which the present invention is embodied has a four stage (pipe 0-pipe 3) pipeline for a basic operation.

Briefly, the pipeline operates as follows. During the first pipe stage, pipe 0, the Instruction Sequencer (7) accesses the instruction cache (9). The I-Cache returns three or four instruction words depending on whether the IP points to an even or odd word address.

During the second pipe stage, pipe 1, the Instruction Sequencer (7) decodes and issues up to three instructions on the three execution portions of the machine—the REG interface (14), the MEM interface (16), and the branch logic within the IS (7). Hardware checks for dependencies and only issues the instructions that can be executed. During this second pipe stage the RF (6) in q12 reads the sources for all the issued operations and sends them to the respective units to use. The IS also calculates the new IP now for branch operations.

During the third pipe stage, pipe 2, the AGEU (3) does the ALU/LDA operations and returns the results to the RF. The RF then writes the results into the destination registers. The RF also calculates the address (for one cycle addressing modes) and passes the address on to the memoery interface for performing loads and stores.

If the operation will take more than one cycle, the scoreboard bits are set (126) and the bus controller (10) issues the address to the DCU for loads and stores (118).

During the fourth pipe stage, pipe 3, the data returns on the data bus from the data cache unit (DCU) to the RF.

Instruction Flow

The instructions include integer/ordinal arithmetic operations (including multiply, divide, remainder), logical and bit manipulation operators, a rich set of conditional branch and comparison instructions, and load, store, and load-effective-address instructions. The system has a full complement of addressing modes for efficient memory addressing. All arithmetic/logical/bit operations have up to 3 register specifiers—two for sources and one for the destination.

Most instructions flow through the pipeline shown in FIG. 3. During the first stage of the pipeline, pipe 0, the next instruction address is calculated and used to fetch the next instruction (INSTf1) from the instruction cache to execute. In pipe 1 the instruction is decoded and issued to the execution unit and then the source operands (OPRf1) are read and sent to the execution unit. In pipe 2 the operation is performed and the result (RES1) is returned to the register file. The hardware is segmented into three separate pieces, each roughly associated with a stage in the pipeline. Pipe 0 hardware roughly corresponds to the Instruction Sequencer (IS). Pipe 1 hardware roughly corresponds to the Register File (RF) and Pipe 2 hardware is mostly contained within the Execution Unit (EU).

Address Calculation and Generation Logic

An addressing mode speedup mechanism is used to improve the performance of some very frequently used addressing modes. It improves the "base-plus-displacement/offset" and the "scaled-index-plus-displacement" addressing modes by one clock most of the time statistically.

The processor has a virtual memory, that is, an addressable address space that appears to a user as real memory, from which instructions and data at logical addresses are mapped onto real memory locations at physical addresses that are translated from the logical addresses. This logical-to-physical translation is done by a translation lookaside buffer (TLB-11) that takes one clock phase to perform this function. This is done during the same phase in the pipeline that the effective address computation is done. The TLB only needs the upper 20 bits, which correspond to the logical page number, to do the translation to a physical address. The lower 12 bits are not needed until the TLB translation is done, because these lower 12 bits refer to address locations within the page selected by the upper 20 bits.

The add of the "base-plus-displacement/offset" usually does not cross a page boundary, that is, the upper 20 bits are the same after the add. This mechanism takes this into account. It "guesses" that the upper 20 bits will not change, so it sends them to the TLB. In parallel with the TLB translation, the effective address add of the "base-plus-displacement" and "scaled-index-plus-displacement" is computed. If the upper 20 bits did not change, then the 20 physical address bits from the TLB plus the lower 12 bits from the address computation are concatenated to produce the complete correct 32-bit physical address. If the upper 20 bits changed due to the actual add then the logical page number (the upper 20 bits) that were given the TLB were wrong. The hardware detects this and signals a "redomemq21" signal that tells the memory side to "redo" the last memory access, but to use the new 32-bit logical address that was just computed by the effective address-generation hardware. This causes a one clock delay when the guess is wrong. When a guess is wrong, the performance is the same as the prior system. When a guess is correct, performance is one clock faster.

The Address Generation Execution Unit (AGEU) performs address calculation for the different types of addressing modes provided. Using the above described technique called the "12-bit optimization," the processor is able to generate addresses for the following three addressing modes in one cycle, as opposed to two cycles in prior processors.

base+offset (12 bits)
base+displacement
index*scale+displacement

Since these are some of the most frequently-used addressing modes, performance benefits of 5–10% are achieved.

Refer to FIG. 4. The operand data for address calculation is made available to the AGEU by the middle of pipe 1-phase2 (i.e., q12). These operands are fed to a 32-bit adder (10), which generates its output by q21.

The "guess" of the upper 20 bits of an address computation is accomplished one cycle early. This is done by performing a logical OR of the two fields (i.e., the upper 20 bits of base are ORed with the upper 20 bits of the displacement in case of a base+displacement type of addressing mode) in the pipe stage q12 and writing out the result in this phase itself. These 20 bits are immediately used by the TLB for further address translation. The TLB doesn't require the lower 12-bits until a phase later (i.e., q21) by which time the adder drives its result onto the lower 12 bits.

The guess in pipe stage q12 could be wrong if:
1. There was a carry between bits during addition of the upper 20 bits. This means that the ADD was not the same as the OR.

Example

| ADD not same as OR |  |
|---|---|
| 0111 + |  |
| 0011 |  |
| 1010 | not the same as (0111) OR (0011) = 0111 |

This condition is easily detected by ANDing the upper 20 bits and getting a result other than zero.
2. There is a carry-out of the addition of the lower 12 bits (i.e., it crosses the page boundary) into the upper 20 bits.

Both of the above-mentioned conditions generate a Redomemq21 signal (26), which tells all the units which use this address that the "guess" was wrong. The correct (ADDed) value is then put out in the next Ph2 (q22).

Figure 2:
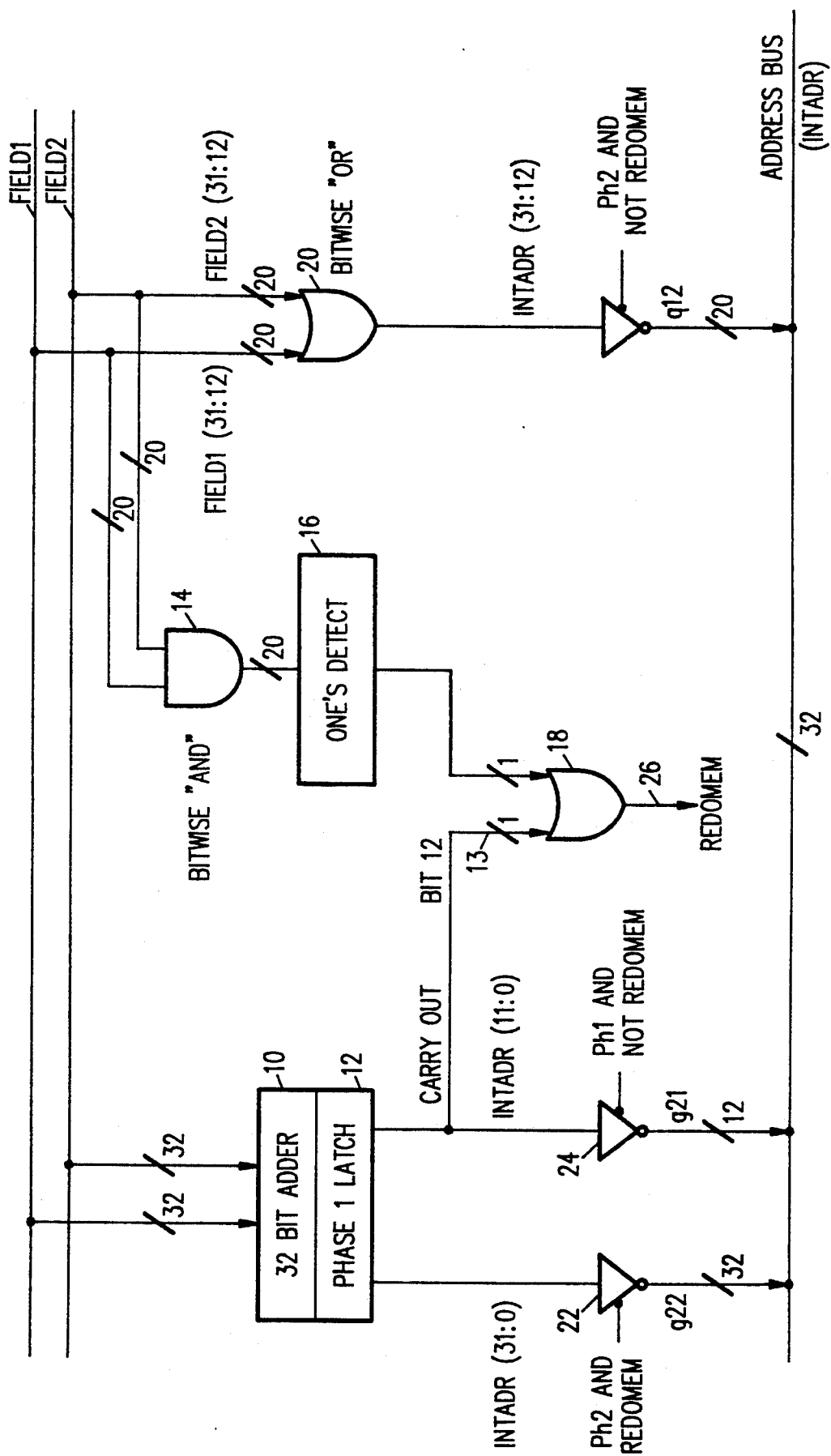
FIG. 2 is a functional block diagram of the address calculation logic within the Address Generation and Execution Unit of FIG. 1.

Refer to FIG. 2. Field 1 and Field 2 are the 32-bit buses which carry the address components into the address generation unit. Field 1 comprises the base, scaled index, etc. Field 2 comprises the offset, displacement, etc. A bit-wise OR (20) is performed on the upper 20 bits of the two fields and the result is written out onto the upper 20 bits of the Address Bus (henceforth called the INTADR Bus), in q12. In the following pipe stage (i.e., q21), the lower 12 bits of Added result are driven out onto the INTADR Bus.

Meanwhile a bit-wise AND (14) is performed on the upper 20 bits of the two address fields. The result is checked (16) for any set bits and if so, then the REDOMEM signal (26) is driven to a "1" in q21. Also, the carry out (13) of bit 12 of the adder is also checked. If it is a "1," then also the REDOMEM signal is driven to "1."

Finally in q22, if REDOMEM is high, the whole 32 bits of the added result (which was added and latched in the previous phase q21) are driven out on the INTADR bus.

TABLE I below summarizes the activity on the address bus during the various pipe stages.

TABLE I

| PIPE STAGE | UPPER 20 ADDRESS BITS | LOWER 12 ADDRESS BITS |
|---|---|---|
| 12 | Drive Guessed Value | — |
| 21 | Retain | Drive Added Result |
| 22 & redo | Drive Added Result | Drive Added Result |
| 31 | Retain | Retain |

Pipeline Operation

Figure 4A:
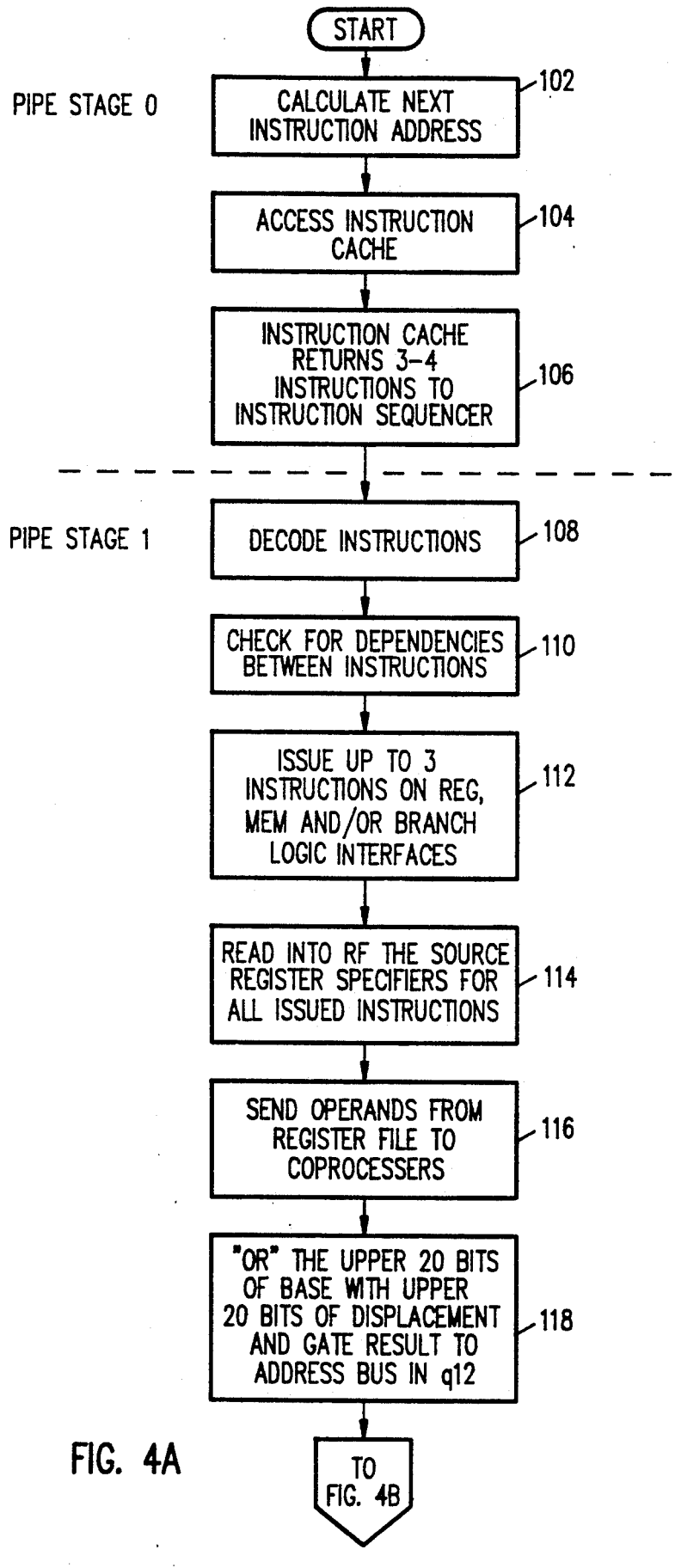

Refer to the flow diagram of FIGS. 4A and 4B for a flow of operations as an instruction passes through each stage of the pipeline.

Pipe 0—Get the instruction

Pipeline stage 0 is when the Instruction Sequencer (7) calculates the next instruction address (102). This could be a macro-instruction or micro-instruction address. It is either the next sequential address or the target of a branch.

The Instruction Sequencer (7) accesses (104) the instruction cache (9). The I-Cache returns (106) three or four instruction words depending on whether the IP points to an even or odd word address.

Pipe 1—Emit stage—Issue and check all resources

During the second pipe stage, pipe 1, the Instruction Sequencer (7) decodes (108) and issues up to three instructions on the three execution portions of the machine, the REG interface (14), the MEM interface (16), and the branch logic within the IS (7). Hardware checks for dependencies (110) and only issues (112) the instructions that can be executed. During this second pipe stage the RF (6) reads (114) the sources for all the issued operations and sends them to the respective units to use. The IS also calculates the new IP now for branch operations.

The instructions get sent (116) to the other units by being driven on the machine bus which consists of three parts:

1. The REG format instruction portion (add, mult, shl, etc).
2. The MEM format instruction portion (ld, st, lda, instruction fetch, etc).
3. The CTRL format portion (branches).

Each part of the machine bus goes to the units that help execute that type of instruction.

The AGEU guesses (118) the upper 20 bits of an address computation by performing a logical OR of the two fields (i.e., the upper 20 bits of BASE are ORed with the upper 20 bits of the DISPLACEMENT in case of a base+displacement type of addressing mode) in the pipe stage q12 and writes out the result in the same phase.

The upper 20 bits of the address are immediately used by the TLB for further address translation. The TLB doesn't require the lower 12-bit until a phase later (i.e., q21) by which time the adder drives its result onto the lower 12 bits.

The operand data for address calculation is made available to the AGEU by the middle of pipe 1-phase2 (i.e., q12). These operands are fed to a 32-bit adder (10) that adds the base and offset and latches the result in q21 (124). If redomem is active or there is a carry out of the adder (122), then the result of the add is gated to the address bus in q22 (126).

Pipe 2—Computation stage and return stage.

During this stage the EU (4) and/or the AGEU (3) do the ALU/LDA operations (132) and return (134) the results to the RF. The RF then writes (136) the results into the destination registers. The result of an ALU operation is computed during q21 and returned to the register file during q22.

During the third pipe stage, the address is issued (128) to the DCU for loads and stores.

Pipe 3

During the fourth pipe stage, pipe 3, assuming a DCU hit, the data returns (130) on the data bus to the RF.

While the invention has been particularly shown and described with reference to preferred embodiments thereof, it will be understood by those skilled in the art that the foregoing and other changes in form and detail may be made therein without departing from the scope of the invention.

What is claimed is:

1. A microprocessor including an address bus and a translation lookaside buffer (TLB) which translates, to a physical address, a logical address comprised of logical address lower bits and logical address upper bits, said logical address upper bits corresponding to a logical page number and said logical address lower bits corresponding to address locations within said logical page, apparatus for forming a physical address from a base logical address and displacement logical address comprising:

first means for combining base logical address upper bits and displacement logical address upper bits to produce result logical address upper bits;

effective address computation means for adding said base logical address and said displacement logical address to produce a calculated address;

detection mean for comparing said base logical address upper bits and said displacement logical address upper bits to produce a redomem signal upon a condition that said base logical address upper bits and said displacement logical address upper bits are the same and a not redomem signal upon a condition that said base logical address upper bits and said displacement logical address upper bits are not the same;

first gating means, connected to said first means, to said effective address computation means, to said detection means, and to said address bus, responsive to said not redomem signal, for grating said result logical address upper bits and said calculated address lower bits to said address bus; and, second gating means connected to said effective address computation means, to said redomem signal, and to said address bus, for gating said calculated address to said address bus.

2. The microprocessor in accordance with claim 1 wherein said effective address computation means includes means for computing an add of a base-plus-displacement.

3. The microprocessor in accordance with claim 1 wherein said effective address computation means includes means for computing an add of a scaled index-plus-displacement.

4. A microprocessor including an address bus and a translation lookaside buffer (TLB) which translates, to a physical addresss, a 32 bit logical address comprises of 12 logical address lower bits and 20 logical address upper bits, said logical address upper bits corresponding to a logical page number and said logical address lower bits corresponding to address locations within said logical page, apparatus for forming a physical address from a 32-bit base logical address and a 32-bit displacement logical address comprising:

first means for combining base logical address upper 20 bits and displacement logical address upper 20 bits to produce result logical address upper 20 bits;

effective address computation means for adding said 32-bit base logical address and said 32-bit displacement logical address to produce a 32-bit calculated address;

detection means for comparing said base logical address upper 20 bits and said displacement logical address upper 20 bits to produce a redomem signal upon a condition that said base logical address upper 20 bits and said displacement logical address upper 20 bits are the same and a not redomem signal upon a condition that said base logical address upper 20 bits and said displacement logical address upper 20 bits are not the same;

first gating means, connected to said first means, to said effective address computation means, to said detection means, and to said address but, responsive to said not redomem signal, for gating said result logical address upper 20 bits and said calculated address lower 12 bits to said address bus; and, second gating means connected to said effective address computation means, to said redomem signal, and to said address bus, for gating said 32-bit calculated address to said address bus.

5. The microprocessor in accordance with claim 4 wherein said effective address computation means includes means for computing an add of a base-plus-displacement.

6. The microprocessor in accordance with claim 4 wherein said effective address computation means includes means for computing an add of a scaled index-plus-displacement.

7. A microprocessor including an address bus and a translation lookaside buffer (TLB) which translates, to a physical address, a logical address comprised of logical address lower bits and logical address upper bits, said logical address upper bits corresponding to a logical page number and said logical address lower bits corresponding to address locations within said logical page, apparatus for forming a physical address from a base logical address and displacement logical address comprising:

an OR for ORing base logical address upper bits and displacement logical address upper bits to produce result logical address upper bits;

an effective address adder for adding said base logical address and said displacement logical address to produce a calculated address;

a detection circuit including a first AND for ANDing said base logical address upper bits and said displacement logical address upper bits and a one's detector that generates a redomem signal upon a condition that said base logical address upper bits and said displacement logical address upper bits are the same and a not redomem signal upon a condition that said base logical address upper bits and said displacement logical address upper bits are not the same;

a second and third AND, connected to said OR, to said effective address adder, to said detection circuit, and to said address bus, responsive to said not redomem signal, for gating said result logical address upper bits and said calculated address lower bits to said address bus; and, a fourth AND connected to said adder, to said redomem signal, and to said address bus, for gating said calculated address to said address bus.

* * * * *

UNITED STATES PATENT AND TRADEMARK OFFICE
CERTIFICATE OF CORRECTION

PATENT NO. : 5,335,333

DATED : August 2, 1994

INVENTOR(S) : Glenn J. Hinton

Gyanendra Tiwary

It is certified that error appears in the above-identified patent and that said Letters Patent is hereby corrected as shown below:

column 1, line 32, change "process or" to -- processor --;
column 1, line 42, change "advantages" to -- advantage --;
column 8, line 26, change "grating" to -- gating --
column 8, line 43, change " comprises" to -- comprised --;

Signed and Sealed this

Seventh Day of February, 1995

BRUCE LEHMAN

Attest:

*Attesting Officer*  *Commissioner of Patents and Trademarks*